US012781522B2

(12) United States Patent
Huth et al.

(10) Patent No.: US 12,781,522 B2
(45) Date of Patent: Nov. 3, 2026

(54) EXTRUDER DEVICE, EXTRUDER SYSTEM, AND USE OF AN EXTRUDER DEVICE AND/OR OF AN EXTRUDER SYSTEM

(71) Applicant: INSTATIQ GmbH, Stuttgart (DE)

(72) Inventors: Tobias Huth, Stuttgart (DE); Knut Kasten, Ostfildern (DE); Werner Tausch, Koengen (DE)

(73) Assignee: INSTATIQ GmbH, Stuttgart (DE)

( * ) Notice: Subject to any disclaimer, the term of this patent is extended or adjusted under 35 U.S.C. 154(b) by 611 days.

(21) Appl. No.: 17/593,775

(22) PCT Filed: Mar. 25, 2020

(86) PCT No.: PCT/EP2020/058301
§ 371 (c)(1),
(2) Date: Sep. 24, 2021

(87) PCT Pub. No.: WO2020/193606
PCT Pub. Date: Oct. 1, 2020

(65) Prior Publication Data

US 2022/0178157 A1 Jun. 9, 2022

(30) Foreign Application Priority Data

Mar. 27, 2019 (DE) ..................... 10 2019 204 259.7

(51) Int. Cl.
*B33Y 30/00* (2015.01)
*B29C 48/05* (2019.01)
(Continued)

(52) U.S. Cl.
CPC .............. *E04G 21/04* (2013.01); *B29C 48/05* (2019.02); *B29C 48/302* (2019.02); *B29C 48/92* (2019.02);
(Continued)

(58) Field of Classification Search
CPC .............. E04G 21/04; E04G 2021/049; B29C 48/05; B29C 48/302; B29C 48/92;
(Continued)

(56) References Cited

U.S. PATENT DOCUMENTS 1,553,592 A 9/1925 Borner
5,234,330 A * 8/1993 Billow .................. B05C 5/0254 425/467
(Continued)

FOREIGN PATENT DOCUMENTS

DE 293636 C 8/1916
DE 643 262 C 4/1937
(Continued)

OTHER PUBLICATIONS

Hindi-language Office Action issued in Indian Application No. 202137041894 dated Jun. 16, 2023 with English translation (6 pages).
(Continued)

*Primary Examiner* — Xiao S Zhao
(74) *Attorney, Agent, or Firm* — Crowell & Moring LLP

(57) ABSTRACT

An extruder apparatus for the extrusion of a strand of building material for 3D printing of a structural part includes an extruder nozzle and at least one inner element. The extruder nozzle has a discharge opening for the discharge of the strand of building material out of the extruder apparatus. The at least one inner element is designed for arrangement within the extruder nozzle for purposes of defining an inner edge of a flow cross section of building material within the extruder nozzle in order to specify an inner edge of a strand cross section of the discharged strand of building material.

12 Claims, 7 Drawing Sheets

(51) Int. Cl.

| | |
|---|---|
| ***B29C 48/30*** | (2019.01) |
| ***B29C 48/92*** | (2019.01) |
| ***E04G 21/04*** | (2006.01) |
| *B33Y 50/02* | (2015.01) |
| *E04B 1/16* | (2006.01) |
| *E04B 2/84* | (2006.01) |

(52) U.S. Cl.

CPC .... *B33Y 30/00* (2014.12); *B29C 2948/92504* (2019.02); *B29C 2948/92904* (2019.02); *B33Y 50/02* (2014.12); *E04B 1/16* (2013.01); *E04B 2/84* (2013.01)

(58) Field of Classification Search

CPC ........... B29C 2948/92504; B29C 2948/92904; B29C 48/345; B33Y 30/00; B33Y 50/02; E04B 1/16; E04B 2/84; B28B 1/001; B28B 3/2627

See application file for complete search history.

(56) References Cited

U.S. PATENT DOCUMENTS

| | | | | |
|---|---|---|---|---|
| 5,308,568 | A * | 5/1994 | Lipp | B28B 3/269 425/461 |
| 6,284,169 | B1 * | 9/2001 | Feuerherm | B29C 48/09 425/465 |
| 7,153,454 | B2 | 12/2006 | Khoshnevis | |
| 2001/0011782 | A1 * | 8/2001 | Ide | B29C 31/044 264/294 |
| 2002/0119004 | A1 * | 8/2002 | Sipherd | E01C 23/03 404/111 |
| 2005/0208173 | A1 * | 9/2005 | Bomba | B29C 48/92 425/466 |
| 2007/0138678 | A1 | 6/2007 | Khoshnevis | |
| 2008/0057148 | A1 * | 3/2008 | Pitch | B29C 48/908 425/464 |
| 2012/0251688 | A1 * | 10/2012 | Zimmerman | A23G 1/18 99/486 |
| 2014/0291886 | A1 * | 10/2014 | Mark | B33Y 10/00 264/259 |
| 2015/0069665 | A1 * | 3/2015 | Lee | B29C 64/106 264/405 |
| 2015/0231799 | A1 | 8/2015 | Wittbold et al. | |
| 2016/0083956 | A1 | 3/2016 | Khoshnevis | |
| 2016/0281267 | A1 * | 9/2016 | Wetzel | B29C 66/5241 |
| 2017/0173879 | A1 * | 6/2017 | Myerberg | B22F 12/53 |
| 2017/0320272 | A1 | 11/2017 | Mantell et al. | |
| 2017/0348906 | A1 * | 12/2017 | Nowak | B29C 64/147 |
| 2018/0345533 | A1 | 12/2018 | Hernandez et al. | |
| 2018/0370117 | A1 | 12/2018 | Gardiner et al. | |
| 2019/0217520 | A1 * | 7/2019 | Schnellbach | B29B 9/065 |
| 2019/0277045 | A1 | 9/2019 | Hirayama | |
| 2020/0002121 | A1 * | 1/2020 | Manuel | B29C 64/321 |
| 2020/0149269 | A1 * | 5/2020 | Crump | D04B 1/00 |
| 2022/0040919 | A1 * | 2/2022 | Czasny | B33Y 30/00 |
| 2022/0143865 | A1 | 5/2022 | Huth et al. | |
| 2022/0184846 | A1 | 6/2022 | Haefner et al. | |
| 2022/0193946 | A1 | 6/2022 | Haefner et al. | |

FOREIGN PATENT DOCUMENTS

| | | | | |
|---|---|---|---|---|
| GB | 191009776 | A | 11/1910 | |
| GB | 130998 | A | 10/1920 | |
| GB | 424117 | A | 2/1935 | |
| GB | 2564083 | A | 1/2019 | |
| JP | 60-72705 | A | 4/1985 | |
| JP | 10-329118 | A | 12/1998 | |
| JP | 2007-518586 | A | 7/2007 | |
| JP | 2008-246790 | A | 10/2008 | |
| JP | 2017-511264 | A | 4/2017 | |
| JP | 2019-157336 | A | 9/2019 | |
| JP | 2022-526538 | A | 5/2022 | |
| JP | 2022-526539 | A | 5/2022 | |
| JP | 2022-526785 | A | 5/2022 | |
| KR | 10-1648768 | B1 | 8/2016 | |
| KR | 10-2017-0125706 | A | 11/2017 | |
| KR | 101948547 | B1 * | 2/2019 | B33Y 70/00 |
| KR | 10-2036571 | B1 | 10/2019 | |
| WO | WO 2004/065707 | A2 | 8/2004 | |
| WO | WO 2017/100853 | A1 | 6/2017 | |

OTHER PUBLICATIONS

International Search Report (PCT/ISA/210) issued in PCT Application No. PCT/EP2020/058301 dated Aug. 24, 2020 with English translation (seven (7) pages).

German-language Written Opinion (PCT/ISA/237) issued in PCT Application No. PCT/EP2020/058301 dated Aug. 24, 2020 (10 pages).

German-language Office Action issued in German Application No. 10 2019 204 259.7 dated Jan. 21, 2020 (14 pages).

Chinese-language Office Action issued in Chinese Application No. 202080025076.3 dated Jul. 13, 2022 with partial English translation (16 pages).

English translation of Japanese-language Office Action issued in Japanese Application No. 2021-557497 dated Apr. 16, 2024 (3 pages).

Saudi Arabian Office Action issued in Saudi Arabian Application No. P6001721/2021 dated Nov. 17, 2024 (9 pages).

Korean-language Office Action issued in Korean Application No. 10-2021-7033856 dated Mar. 21, 2025 with English translation (8 pages).

United Arab Emirates Office Action issued in United Arab Emirates Application No. P6001721/2021 dated Nov. 17, 2024 (9 pages).

* cited by examiner

EXTRUDER DEVICE, EXTRUDER SYSTEM, AND USE OF AN EXTRUDER DEVICE AND/OR OF AN EXTRUDER SYSTEM

FIELD OF APPLICATION AND PRIOR ART

The invention relates to an extruder apparatus for the extrusion of a strand of building material for 3D printing of a structural part, to an extruder system having such an extruder apparatus, and to the use of such an extruder apparatus and/or of such an extruder system.

PROBLEM AND SOLUTION

The problem addressed by the invention is that of providing an extruder apparatus for the extrusion of a strand of building material for 3D printing of a structural part, which extruder apparatus has improved characteristics, in particular allows more degrees of freedom. A further problem addressed by the invention is that of providing an extruder system having such an extruder apparatus and the use of such an extruder apparatus and/or of such an extruder system.

The invention solves this problem by providing an extruder apparatus, an extruder system, and the use of the extruder apparatus and system, in accordance with the independent claims. Advantageous refinements and/or configurations of the invention are described in the dependent claims.

The extruder apparatus according to the invention is designed or configured for the extrusion of a strand of building material for 3D printing of an in particular 3-dimensional structural part. The extruder apparatus has an extruder nozzle and at least one inner element. The extruder nozzle has a discharge opening for the discharge of the strand of building material out of the extruder apparatus, in particular the extruder nozzle. The in particular at least one inner element is designed or configured or is arranged and defined for in particular complete arrangement within the extruder nozzle for the purposes of defining or delimiting in particular at least one inner edge or one inner part of an in particular shape-imparting flow cross section, in particular an area of the flow cross section, of building material within the extruder nozzle for the purposes of specifying, in particular specifying the shape of, in particular at least one inner edge or one inner part of a strand cross section, in particular an area of the strand cross section, of the discharged strand of building material.

In particular, the extruder apparatus can be referred to as extruder head. Additionally or alternatively, the extruder apparatus, in particular the extruder nozzle, may be designed or configured for the extrusion or for the discharge of the strand of building material out of the extruder apparatus, in particular the extruder nozzle, in particular the discharge opening, in a non-vertical, in particular horizontal discharge direction. In other words: the extruder apparatus, in particular the extruder nozzle, does not need to be, or may not be, designed or configured for the extrusion or for the discharge of the strand of building material out of the extruder apparatus, in particular the extruder nozzle, in particular the discharge opening, in a vertical discharge direction. Further additionally or alternatively, the extruder apparatus may be designed to deposit the discharged strand such that the in particular deposited strand maintains its strand cross section, in particular of the discharged strand. In other words: the extruder apparatus does not need to be, or may not be, designed such that the building material needs to be, or can be, printed onto an already existing building material layer or ply and thus deformed.

The in particular discharged strand may be continuous or may extend over an in particular certain length.

The building material may be concrete, in particular fresh concrete, and/or thixotropic and/or set or dimensionally stable, in particular during the discharge. Further additionally or alternatively, the building material may have a maximum grain size of a minimum of 4 millimeters (mm), in particular of a minimum of 10 mm, in particular of a minimum of 16 mm.

3D printing can be referred to as additive manufacturing. Additionally or alternatively, the strand may be deposited or applied, in particular in layers, on or onto an already extruded strand, and/or a further strand may be deposited or applied, in particular in layers, on or onto the strand.

The structural part may be a building structural part and/or a wall and/or a ceiling. Additionally or alternatively, the strand, in particular a width of the strand, may have the thickness, in particular the entire thickness, of the wall and/or ceiling.

The extruder nozzle, in particular the discharge opening, may be tubular and/or peripherally closed, in particular in/counter to at least one peripheral direction which is orthogonal with respect to a discharge direction, in particular by at least one peripheral wall, in particular without an inner element. Additionally or alternatively, the extruder nozzle may have the discharge opening at an in particular face-side and/or front end. Further additionally or alternatively, the discharge opening can be referred to as a dispensing opening or application opening. Further additionally or alternatively, the discharge opening may be planar or flat. Further additionally or alternatively, the discharge opening may have an in particular maximum opening width of a minimum of 100 mm, in particular a minimum of 200 mm, and/or a maximum of 800 mm, in particular a maximum of 600 mm, in particular 400 mm, in particular in a first peripheral direction which is orthogonal with respect to a discharge direction, in particular without an inner element. Further additionally or alternatively, the discharge opening may have an in particular maximum opening height of a minimum of 15 mm, in particular a minimum of 25 mm, and/or a maximum of 400 mm, in particular a maximum of 200 mm, in particular a maximum of 100 mm, in particular 50 mm, in particular in a second peripheral direction which is orthogonal with respect to a discharge direction, in particular without an inner element. Further additionally or alternatively, the discharge opening may have a quadrangular shape, in particular a trapezoidal shape, in particular a parallelogram shape, in particular a rectangular shape, in particular without an inner element.

The extruder apparatus may have two inner elements. Additionally or alternatively, the at least one inner element may differ from the extruder nozzle. Further additionally or alternatively, the at least one inner element may in particular either be spaced from the discharge opening, in particular by at most 50 mm, in particular by at most 20 mm, in particular by at most 10 mm, or arranged upstream of the discharge opening, in particular counter to a discharge direction, or extend in particular at most as far as the discharge opening. Further additionally or alternatively, the at least one inner element may be in particular at least partially arranged spaced apart from the extruder nozzle or at least one peripheral wall of the extruder nozzle, in particular in/counter to at least one peripheral direction that is orthogonal with respect to a discharge direction. In particular, the at least one inner element may extend from the extruder nozzle or from at least one peripheral wall of the extruder nozzle, in particular orthogonally, in particular in/counter to at least one peripheral direction that is orthogonal with respect to a discharge direction and/or inward. Further additionally or alternatively, the flow cross section, in particular an area of the flow cross section, may be at least 5 percent (%), in particular at least 10%, in particular at least 20%, in particular at least 50%, smaller than a nozzle cross section of the extruder nozzle, in particular an opening cross section of the discharge opening, in particular an area of the nozzle cross section or of the opening cross section, in particular without an inner element.

The strand cross section, in particular a shape and/or a size of the strand cross section, may correspond, in particular equate, to the flow cross section, in particular a shape and/or a size of the flow cross section. Additionally or alternatively, the flow cross section and/or the strand cross section may in particular each be non-parallel, in particular orthogonal, with respect to a discharge direction.

This, in particular the at least one inner element, allows the flow cross section that differs from a nozzle cross section of the extruder nozzle, in particular from an opening cross section of the discharge opening, in particular from a shape and/or a size of the nozzle cross section or of the opening cross section, in particular without an inner element, in particular a different shape and/or a different size of the flow cross section, and thus the different strand cross section, in particular a different shape and/or a different size of the strand cross section. In particular, this can allow the structural part to be printed with slots, holes or channels, in particular for lines or cables and/or pipes or for media such as electricity and/or water. These therefore do not need to be produced, in particular in laborious fashion, if this is possible at all with reasonable effort, at a time after the printing, in particular by work operatives. The extruder apparatus thus has improved characteristics, in particular allows more degrees of freedom.

In a further development of the invention, the in particular at least one inner element is in particular in each case designed or configured or mounted to be in particular individually or separately, variably, in particular continuously, settable or adjustable, in particular movable, in particular into at least two different settings, for the purposes of variable, in particular continuous, setting or adjustment within the extruder nozzle for the purposes of variably, in particular continuously, setting or adjusting the inner edge of the flow cross section for the purposes of variably, in particular continuously, setting or adjusting the inner edge of the strand cross section, in particular during the discharge of the strand of building material. This makes it possible, in particular, to realize different geometrical characteristics and/or modifications in the printed structural part. In particular, the in particular at least one inner element may be designed to be variably settable without the use of tools.

In one embodiment of the invention, the in particular at least one inner element, in a first, in particular inner, setting, in particular does not specify an inner edge of the flow cross section and thus does not specify an inner edge of the strand cross section.

Additionally or alternatively, in a second, in particular outer setting, which in particular differs from the first, the in particular at least one inner element specifies a division into two parts by means of an interruption, in particular in an particular horizontal direction, in particular in the first peripheral direction, in particular of the flow cross section, and thus of the strand cross section.

This, in particular the first setting, makes it possible to realize the continuous or uninterrupted strand.

This, in particular the second setting, allows channels to be generated in the interior of the structural part, in particular of the wall, such that lines can be laid in a concealed manner.

In particular, the interruption may extend over the full, in particular maximum, opening height. Additionally or alternatively, the interruption may have a quadrangular shape, in particular a trapezoidal shape, in particular a parallelogram shape, in particular a rectangular shape.

In one embodiment of the invention, the extruder apparatus has at least, in particular only, two inner elements. The two inner elements are, in particular in each case, designed or configured or mounted so as to be variably settable, in particular into the first setting and the second setting, for the purposes of variable, in particular continuous, arrangement with respect to one another for the purposes of variably setting the inner edge of the flow cross section. In particular, the two inner elements may, in particular partially or by way of ends at the side of the discharge opening, be arranged close together or be brought together in the first setting and/or be arranged remote or spaced apart from one another in the second setting.

In one refinement of the invention, the extruder nozzle specifies an in particular non-vertical, in particular horizontal, discharge direction of the strand of building material out of the extruder apparatus, in particular the extruder nozzle, in particular the discharge opening. The in particular at least one inner element has in particular at least one flow-directing surface for directing the flow, or flow-guiding surface for guiding the flow, of building material within the extruder nozzle for the purposes of defining the inner edge of the flow cross section. The in particular at least one flow-directing surface is designed or configured or is oriented for non-orthogonal, in particular parallel orientation with respect to the discharge direction. In particular, the discharge direction may be parallel, in particular coaxial, with respect to a longitudinal axis of the extruder nozzle. Additionally or alternatively, the in particular at least one flow-directing surface may be planar or flat. Further additionally or alternatively, the in particular at least one flow-directing surface may extend along the discharge direction.

In one refinement of the invention, the in particular at least one inner element is an inner wall. In particular, the in particular at least one inner wall may be planar or flat and/or a metal sheet.

In one refinement of the invention, the extruder nozzle has multiple peripheral walls. The peripheral walls define or delimit an outer edge or an outer part of the in particular shape-imparting flow cross section, in particular an area of the flow cross section, of building material for the purposes of specifying, in particular specifying the shape of, an outer edge or an outer part of the strand cross section, in particular an area of the strand cross section, of the discharged strand of building material. In particular, at least one of the peripheral walls may be planar or flat and/or a metal sheet. Additionally or alternatively, the outer edge may differ from the inner edge. Further additionally or alternatively, the peripheral walls may peripherally define the discharge opening.

In one embodiment of the invention, at least two of the peripheral walls are designed or configured or mounted so as to be variably, in particular continuously, settable or adjustable, in particular movable, in particular into at least two different settings, for the purposes of variable, in particular continuous, arrangement with respect to one another for the purposes of variably, in particular continuously, setting or adjusting the outer edge of the flow cross section for the purposes of variably, in particular continuously, setting or adjusting the outer edge of the strand cross section, in particular during the discharge of the strand of building material. This allows additional degrees of freedom, in particular in terms of the shaping of the flow cross section and thus in particular the shaping of the strand cross section. In particular, at least one of the in particular settable peripheral walls may be movable relative to the other peripheral walls and/or the in particular at least one inner element, in particular in/counter to the first peripheral direction and/or the second peripheral direction. Further additionally or alternatively, at least one of the in particular settable peripheral walls may be designed to be variably settable without the use of tools.

In one refinement of the invention, the extruder nozzle has in particular the at least one peripheral wall. An extent of the extruder apparatus in an in particular vertical direction, in particular counter to the second peripheral direction, in particular downward, is defined or delimited by the peripheral wall. The discharge opening is peripherally defined or delimited, in particular at least partially, in particular in the direction, in particular downward, by the peripheral wall.

Additionally or alternatively, the extruder apparatus has a deflecting device or a deflecting element. The deflecting device is arranged upstream of the discharge opening, in particular of the extruder nozzle, and is designed or configured to deflect a flow or a stream of building material in particular from a non-horizontal, in particular vertical direction, in particular counter to the second peripheral direction, in particular from top to bottom, in the direction, in particular in the discharge direction, in particular from rear to front, of the discharge opening.

This, in particular the extent defined by the peripheral wall, allows the strand to be extruded, in particular in the horizontal discharge direction, at a relatively short distance in particular vertically above an already extruded strand, in particular without damaging the latter, and thus allows the discharged strand to be deposited from a relatively low height.

This, in particular the deflecting device, allows the horizontal discharge.

In particular, the at least one peripheral wall may be planar or flat and/or a metal sheet.

The extruder system according to the invention is designed or configured for the extrusion of a, in particular the, strand of building material for 3D printing of a, in particular the, structural part. The extruder system has an, in particular the, extruder apparatus as described above.

Additionally, the extruder system according to the invention has in particular at least one in particular controllable and/or electrical setting apparatus or adjusting apparatus. The in particular at least one setting apparatus is designed or configured for the in particular automatic, variable, in particular continuous setting or adjustment of the in particular at least one and/or variably settable inner element and/or the in particular at least one and/or variably settable peripheral wall. In particular, the extruder apparatus may have the in particular at least one setting apparatus. Additionally or alternatively, the in particular at least one setting apparatus may have or be at least one in particular electrical and/or hydraulic and/or pneumatic setting motor and/or at least one in particular mechanical setting drive.

Additionally or alternatively, the extruder system according to the invention has an in particular controllable movement apparatus. The movement apparatus is designed or configured for in particular automatically at least translationally moving the extruder apparatus, in particular the extruder nozzle and the in particular at least one inner element, in particular during the discharge of the strand of building material. In particular, the movement apparatus can be referred to as positioning apparatus. Additionally or alternatively, the movement apparatus may have or be a movement or robot arm or a mast. Additionally or alternatively, the movement apparatus and/or the extruder apparatus may be designed for in particular automatically rotationally moving the extruder apparatus, in particular the extruder nozzle and the in particular at least one inner element, in particular during the discharge of the strand of building material.

In one refinement of the invention, the movement apparatus is designed or configured to move the extruder apparatus in an in particular non-vertical, in particular horizontal movement direction. The extruder apparatus is designed or configured for the discharge of the strand of building material out of the extruder apparatus, in particular the extruder nozzle, in particular the discharge opening, in a discharge direction, which is non-orthogonal, in particular reversed, in particular opposite, with respect to the movement direction, in particular during the movement.

Additionally or alternatively, the extruder system, in particular the extruder apparatus, is designed or configured for the discharge of the strand of building material out of the extruder apparatus, in particular the extruder nozzle, in particular the discharge opening, with an in particular variable in particular continuously settable or adjustable discharge speed. The movement apparatus is designed or configured to move the extruder apparatus at a movement speed approximately equal to the discharge speed, in particular during the discharge.

This, in particular the approximately equal movement speeds, makes it possible for the discharged and/or deposited strand to maintain its strand cross section which in particular corresponds, in particular equates, to the flow cross section.

In particular, reversed can mean a minimum of 135 degrees (°), in particular a minimum of 150°, in particular 165°. Additionally or alternatively, opposite can mean 180°. Further additionally or alternatively, approximately can mean a difference or a deviation of at most 5 percent (%), in particular of at most 2%, in particular of at most 1%.

Additionally or alternatively, the extruder system according to the invention has an in particular controllable building material pump. The building material pump is designed or configured to in particular automatically convey building material out of the extruder apparatus, in particular the extruder nozzle, in particular the discharge opening. In particular, the extruder system may comprise a building material conveying line, wherein the building material conveying line may connect the building material pump to the extruder apparatus, in particular the extruder nozzle, for a flow or a stream of building material from the building material pump through the building material conveying line to the extruder apparatus, in particular the extruder nozzle. Additionally or alternatively, the building material pump may be discontinuous, in particular a piston pump, in particular a two-piston pump, in particular having a pipe switch.

In one refinement of the invention, the extruder system comprises an in particular electrical control device, in particular a computer. The control device is designed or configured to in particular automatically and/or independently control the in particular at least one in particular controllable setting apparatus and/or the in particular controllable movement apparatus and/or the in particular controllable building material pump in a manner dependent on data, in particular a building or construction plan, in particular in a memory of the control device, of the structural part to be printed. This makes it possible that a work operative does not need to control the extruder system, and/or that errors during the construction process can be reduced or even avoided.

Furthermore, the invention relates to the use of an, in particular the, extruder apparatus and/or of an, in particular the, extruder system as described above for the extrusion of a, in particular the, strand of building material for 3D printing of a, in particular the, structural part.

BRIEF DESCRIPTION OF THE DRAWINGS

Further advantages and aspects of the invention arise from the claims and from the following description of preferred exemplary embodiments of the invention, which are explained below on the basis of the figures.

DETAILED DESCRIPTION OF THE EXEMPLARY EMBODIMENTS

Figure 1:
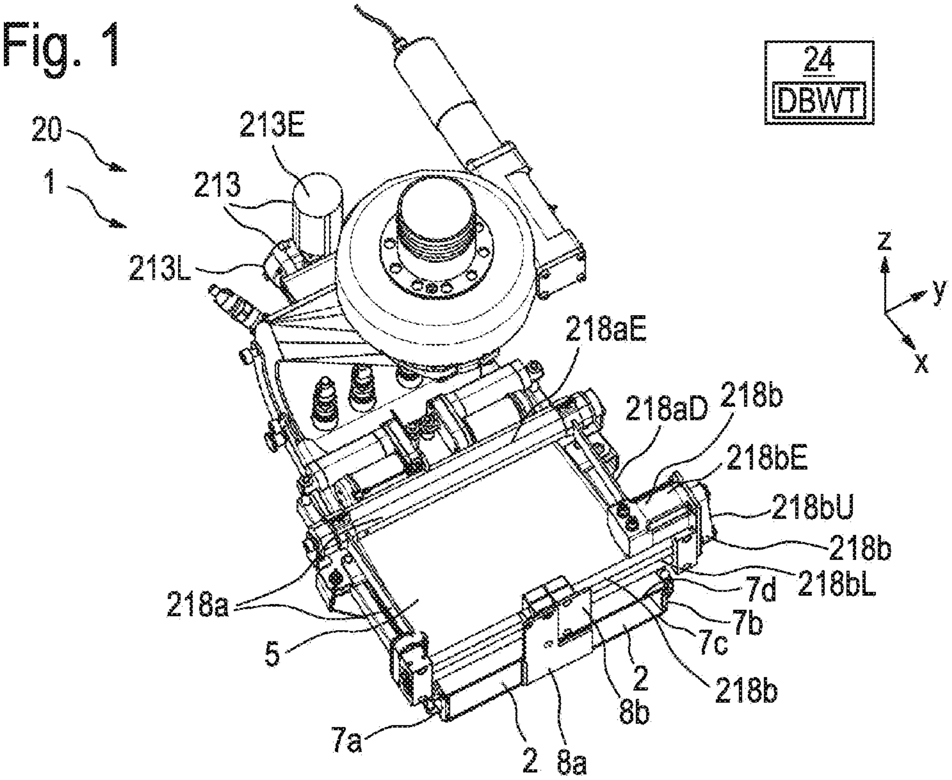
FIG. 1 shows a perspective view of an extruder system according to the invention with an extruder apparatus according to the invention.
Figure 2:
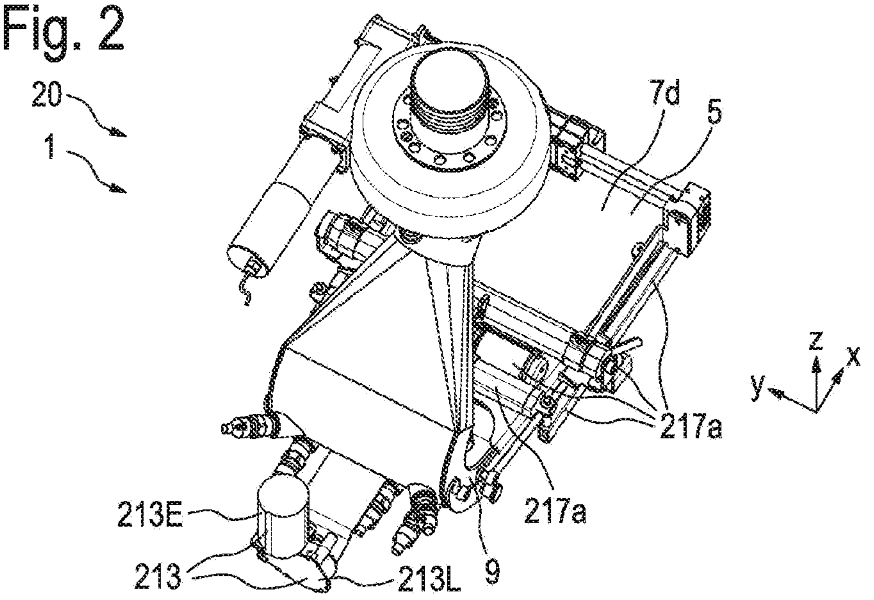
FIG. 2 shows a further perspective view of the extruder system with the extruder apparatus of FIG. 1.

FIGS. 1 to 12 and 14 in particular each show an extruder system 20 having an extruder apparatus 1 for extrusion of a strand ST of building material BS for 3D printing of a structural part BWT. The extruder apparatus 1 has an extruder nozzle 5 and at least one inner element 30*a*, 30*b*. The extruder nozzle 5 has an in particular rectangular discharge opening 2 for the discharge of the strand ST of building material BS out of the extruder apparatus 1. The at least one inner element 30*a*, 30*b* is designed for arrangement within the extruder nozzle 5 for the purposes of defining in particular at least one inner edge 351 of an in particular rectangular flow cross section 35 of building material BS within the extruder nozzle 5 for the purposes of specifying in particular at least one inner edge 41 of an in particular rectangular strand cross section 4 of the discharged strand ST of building material BS.

In the exemplary embodiments shown, the extruder apparatus 1 has in particular exactly two inner elements 30*a*, 30*b*. In alternative exemplary embodiments, the extruder apparatus may have in particular only one or at least three inner elements.

Furthermore, the at least one inner element 30*a*, 30*b* is designed to be variably settable, in particular movable relative to the extruder nozzle 5, in particular in/counter to a first peripheral direction y, for the purposes of variable setting within the extruder nozzle 5 for the purposes of variably setting the inner edge 351 of the flow cross section 35 for the purposes of variably setting the inner edge 41 of the strand cross section 4, in particular during the discharge of the strand ST of building material BS. In alternative exemplary embodiments, the at least one inner element may additionally or alternatively be movable in/counter to a second peripheral direction.

Figure 8:
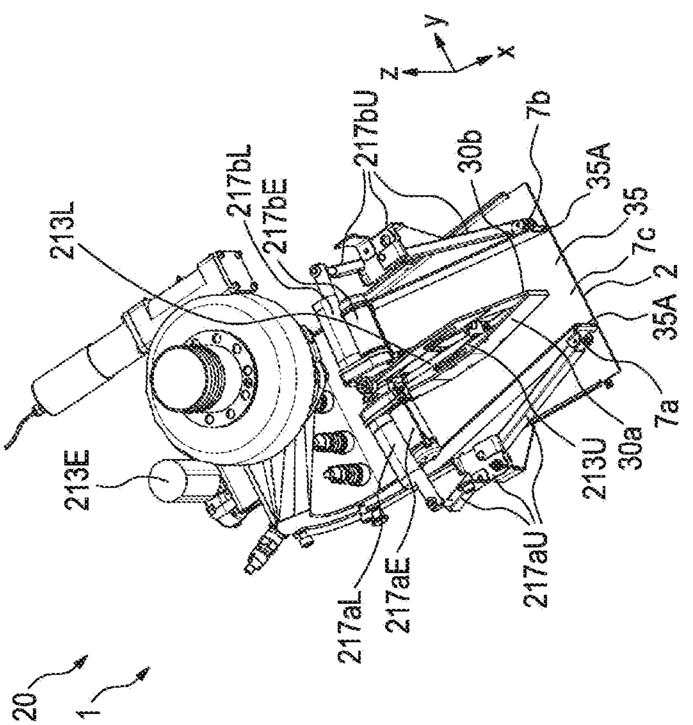
FIG. 8 shows a perspective view of the extruder system with the extruder apparatus of FIG. 7.
Figure 7:
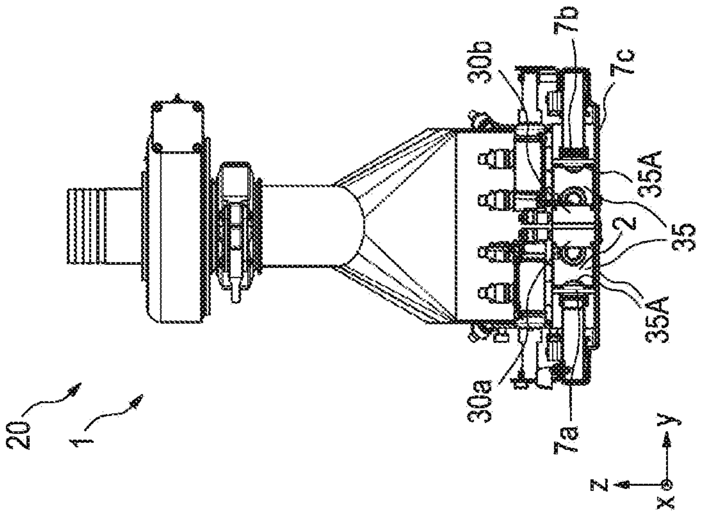
FIG. 7 shows a front view of the extruder system with the extruder apparatus of FIG. 1 with the at least one inner element in the first setting and the at least one peripheral wall in a second setting, without an upper peripheral wall, without a hose and without a cover element.
Figure 13:
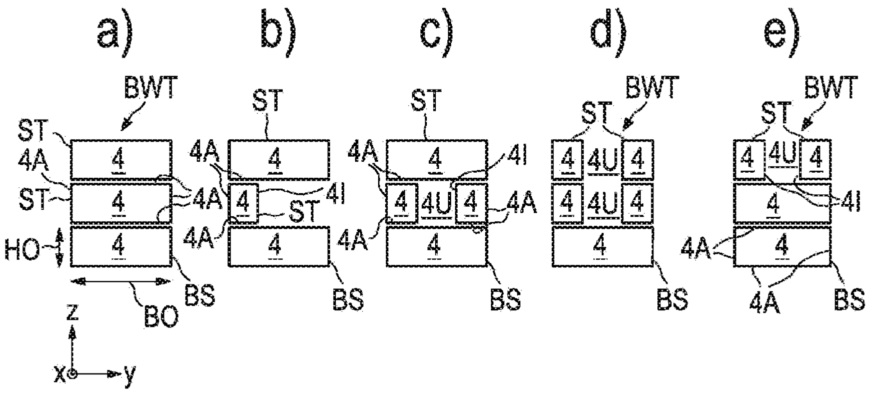
FIG. 13 shows structural parts 3D-printed using an extruder apparatus according to the invention and/or an extruder system according to the invention and composed of extruded strands of building material.

In detail, the at least one inner element 30*a*, 30*b*, in a first, in particular inner, setting, does not specify an inner edge of the strand cross section 4, as shown in FIGS. 7 and 8 and FIG. 13 a), b) at the bottom and top, c) at the bottom and top, d) at the bottom and e) at the bottom and in the middle.

Figure 6:
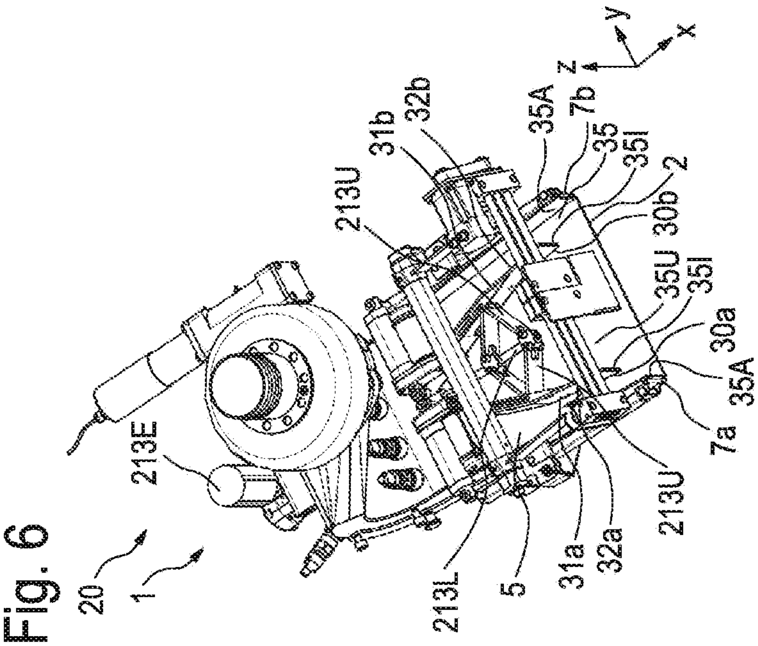
FIG. 6 shows a perspective view of the extruder system with the extruder apparatus of FIG. 5.
Figure 5:
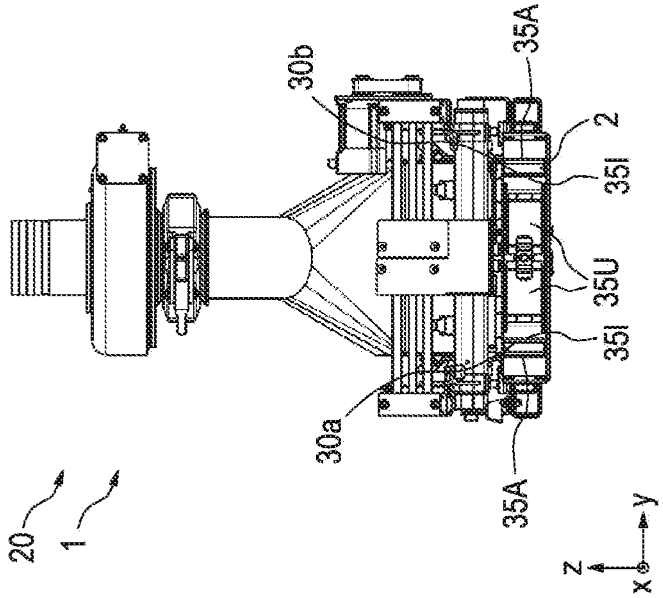
FIG. 5 shows a front view of the extruder system with the extruder apparatus of FIG. 1 with the at least one inner element in a second setting, the at least one peripheral wall in the first setting and the at least one cover element in a first setting, without an upper peripheral wall and without a hose.

Additionally or alternatively, in a second, in particular outer setting, the at least one inner element 30*a*, 30*b* specifies a division into two parts by means of an in particular rectangular interruption 4U, in particular in an particular horizontal direction, in particular in the first peripheral direction y, of the strand cross section 4, as shown in FIGS. 5 and 6 and FIG. 13 b) in the middle, c) in the middle, d) in the middle and at the top and e) at the top.

In the exemplary embodiments shown, the interruption 4U is entirely over an in particular maximum opening height HO of the discharge opening 2. In alternative exemplary embodiments, the interruption may be in particular only partially over the in particular maximum opening height of the discharge opening.

In addition, the two inner elements 30*a*, 30*b* are designed to be settable, in particular into the first setting and the second setting, for the purposes of variable arrangement with respect to one another for the purposes of variably setting the inner edge 35I of the flow cross section 35.

In the exemplary embodiments shown, in the first setting, the two inner elements 30*a*, 30*b*, by way of ends at the side of the discharge opening, are arranged close together or lie against one another. Thus, in the first setting, the two inner elements 30*a*, 30*b* do not specify an inner edge of the flow cross section 35, in particular close to or in the region of the discharge opening 2, and thus do not specify an inner edge of the strand cross section 4. In particular, the flow cross section 35 without an inner edge, in particular close to or in the region of the discharge opening 2, specifies the strand cross section 4 without an inner edge.

Additionally or alternatively, in the second setting, the two inner elements 30*a*, 30*b*, by way of the ends at the side of the discharge opening, are arranged remote from one another, in particular in/counter to the first peripheral direction y. Thus, in the second setting, the two inner elements 30*a*, 30*b* specify a division into two with an in particular rectangular interruption 35U, in particular in an in particular horizontal direction, in particular in the first peripheral direction y, of the flow cross section 35, in particular close to or in the region of the discharge opening 2, and thus the division into two, with the interruption 4U, of the strand cross section 4. In particular, the two-part flow cross section 35 with the interruption 35U, in particular close to or in the region of the discharge opening 2, specifies the two-part strand cross section 4 with the interruption 4U.

The extruder nozzle 5 furthermore specifies an in particular horizontal discharge direction x of the strand ST of building material BS out of the extruder apparatus 1. The at least one inner element 30*a*, 30*b* has in particular in each case one flow-directing surface 31*a*, 31*b* for directing the flow of building material BS within the extruder nozzle 5 for the purposes of defining the inner edge 351 of the flow cross section 35. The in particular at least one flow-directing surface 31*a*, 31*b* is designed, in particular oriented in the exemplary embodiments shown, for non-orthogonal, in particular parallel, orientation with respect to the discharge direction x.

Furthermore, the at least one inner element 30*a*, 30*b* is an inner wall 32*a*, 32*b*.

Furthermore, the extruder nozzle 5 has multiple peripheral walls 7*a*, 7*b*, 7*c*, 7*d*, four in the exemplary embodiments shown. The peripheral walls 7*a*, 7*b*, 7*c*, 7*d* define an outer edge 35A of the flow cross section 35 of building material BS for the purposes of specifying an outer edge 4A of the strand cross section 4 of the discharged strand ST of building material BS.

In detail, at least two, in the exemplary embodiments shown exactly two, of the peripheral walls 7*a*, 7*b* are designed to be variably settable for the purposes of variable arrangement with respect to one another for the purposes of variably setting the outer edge 35A of the flow cross section 35 for the purposes of variably setting the outer edge 4A of the strand cross section 4, in particular during the discharge of the strand ST of building material BS.

In the exemplary embodiments shown, a left-hand peripheral wall 7*a* and a right-hand peripheral wall 7*b* are in particular each designed to be variably settable, in particular movable in/counter to the first peripheral direction y, for the purposes of variably setting a width of the flow cross section 35 for the purposes of variably setting a width of the strand cross section 4 or an opening width BO of the discharge opening 2. Additionally or alternatively, in alternative exemplary embodiments, a lower peripheral wall and/or an upper peripheral wall may in particular each be designed to be variably settable, in particular movable in/counter to the second peripheral direction, for the purposes of variably setting a height of the flow cross section for the purposes of variably setting a height of the strand cross section or the opening height of the discharge opening.

In a first setting shown in FIGS. 1 to 6, the two peripheral walls 7*a*, 7*b* are in particular each arranged as far to the outside as possible, or with a maximum spacing to one another, such that the width of the flow cross section 35 and thus the width of the strand cross section 4 or the opening width BO of the discharge opening 2 is set to a maximum or to be wide, in the exemplary embodiments shown 400 mm.

In a second setting shown in FIGS. 7 and 8, which in particular differs from the first setting, the two peripheral walls 7*a*, 7*b* are in particular each arranged as far to the inside as possible, or with a minimum spacing to one another, or so as to be as close together as possible, such that the width of the flow cross section 35 and thus the width of the strand cross section 4 or the opening width BO of the discharge opening 2 is set to a minimum or to be narrow, in the exemplary embodiments shown 200 mm.

In the embodiments shown, an opening height HO of the discharge opening 2 is 50 mm, in particular in the second peripheral direction z.

Figure 10:
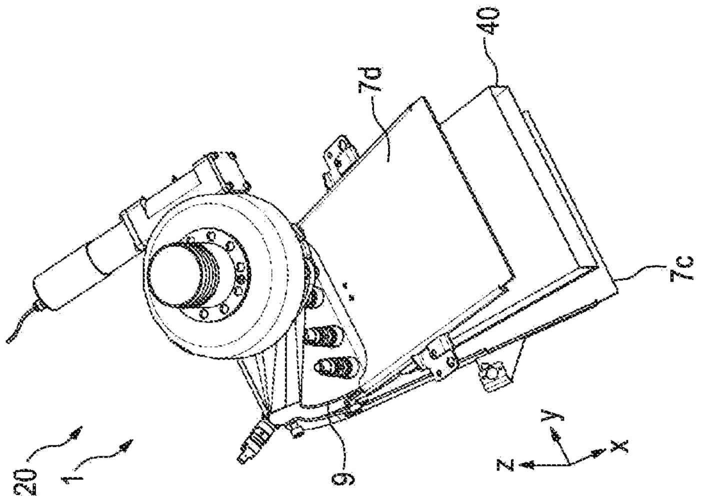
FIG. 10 shows a perspective view of the extruder system with the extruder apparatus of FIG. 1 with a pivoted-open upper peripheral wall and a pivoted-open lower peripheral wall and with a hose without a cover element.

In detail, the extruder apparatus 1 has a hose 40 that is expandable, in particular by approximately a factor of 2, wherein the expandable hose 40 is arranged and designed to seal off the peripheral walls 7*a*, 7*b*, 7*c*, 7*d* against a peripheral discharge of building material BS, as shown in FIG. 10. In particular, the at least one inner element 30*a*, 30*b* is designed, in particular arranged, for arrangement within the hose 40.

Additionally or alternatively, at least one of the peripheral walls 7*c*, 7*d* is designed for being peripherally pivoted open, in particular in/counter to the second peripheral direction z, as shown in FIG. 10. This, in particular the pivoting open, allows easy installation of the expandable hose 40 and easy cleaning of the extruder system 20, in particular of the extruder apparatus 1, after the extrusion process, in particular after the concreting process.

In addition, an extent of the extruder apparatus 1 in an in particular vertical direction, in particular counter to the second peripheral direction −z, is defined by the in particular lower peripheral wall 7*c*. The discharge opening 2 is peripherally defined partially, in particular in the direction −z, by the in particular lower peripheral wall 7*c*.

Additionally or alternatively, the extruder apparatus 1 has a deflecting device 9. The deflecting device 9 is arranged upstream of the discharge opening 2 and is designed to deflect a flow of building material BS, in particular from a pipe flange, in the direction, in particular in the discharge direction x, of the discharge opening 2.

The extruder apparatus 1 also has at least one cover element 8*a*, 8*b*. The at least one cover element 8*a*, 8*b* has a variably settable design, in particular is movable, in particular in/counter to a first peripheral direction y and/or second peripheral direction z, in particular relative to the discharge opening 2 or the extruder nozzle 5, in particular into at least two, in particular at least three, different settings, for the variably settable covering of at least one part of the discharge opening 2.

In the exemplary embodiments shown, the extruder apparatus 1 has in particular exactly two cover elements 8*a*, 8*b*. In alternative exemplary embodiments, the extruder apparatus may have in particular only one or at least three cover elements.

In detail, the at least one cover element 8, 8*a*, 8*b* is designed to be variably settable for the purposes of separating off, in particular cutting off, the discharged strand ST of building material BS from the extruder apparatus 1, in particular at the discharge opening 2. This can allow an in particular clean or smooth end of the in particular discharged and/or deposited strand 4, in particular at a time after the extrusion, in particular during the transposition of the extruder apparatus 1, in particular between different wall elements.

In the exemplary embodiments shown, the at least one cover element 8*a*, 8*b* has a cutting plate or a blade 8*a*K, 8*b*K.

In a first setting shown in FIGS. 5 and 6, the at least one cover element 8*a*, 8*b* does not cover any part of the discharge opening 2. In particular, the at least one cover element 8*a*, 8*b* is lifted off in the second peripheral direction z.

Figure 4:
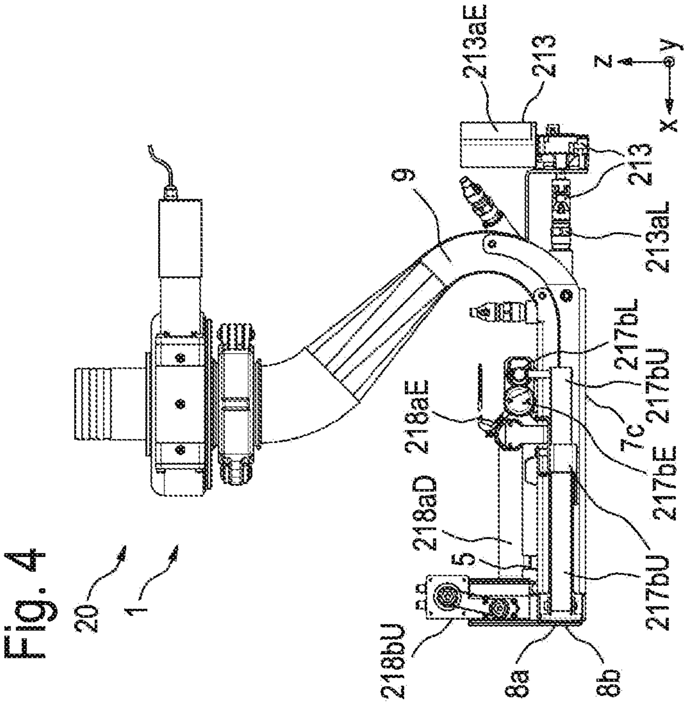
FIG. 4 shows a side view of the extruder system with the extruder apparatus of FIG. 3.
Figure 3:
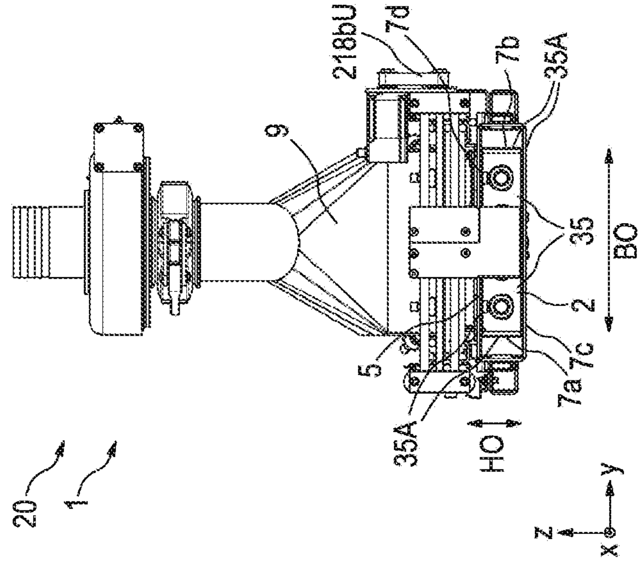
FIG. 3 shows a front view of the extruder system with the extruder apparatus of FIG. 1 with at least one inner element in a first setting, at least one peripheral wall in a first setting and at least one cover element in a second setting.

In a second setting which is shown in FIGS. 1 and 4 and which in particular differs from the first, the at least one cover element 8*a*, 8*b* covers an in particular inner part of the discharge opening 2.

Figure 9:
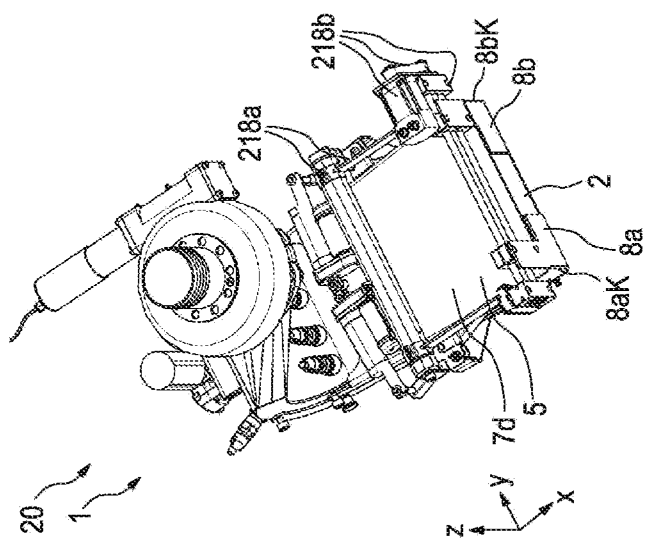
FIG. 9 shows a perspective view of the extruder system with the extruder apparatus of FIG. 1 with the at least one cover element in a third setting.

In a third setting which is shown in FIG. 9 and which in particular differs from the first and second, the at least one cover element 8*a*, 8*b* covers two in particular outer parts of the discharge opening 2.

By movement from/to the setting shown in FIGS. 1 to 4 to/from the setting shown in FIG. 9 of the at least one cover element 8*a*, 8*b*, in particular in/counter to the first peripheral direction y, the discharged strand ST of building material BS is separated off from the extruder apparatus 1.

Additionally or alternatively, an extent of the extruder apparatus 1 in an in particular horizontal direction, in particular in the discharge direction x, in particular toward the front, is defined by the at least one cover element 8*a*, 8*b*. This allows an in particular clean or smooth separating-off action and/or an in particular clean depositing of the discharged strand and/or an particular clean or smooth connection of the strand to an already extruded strand, in particular without damaging the latter.

Figure 11:
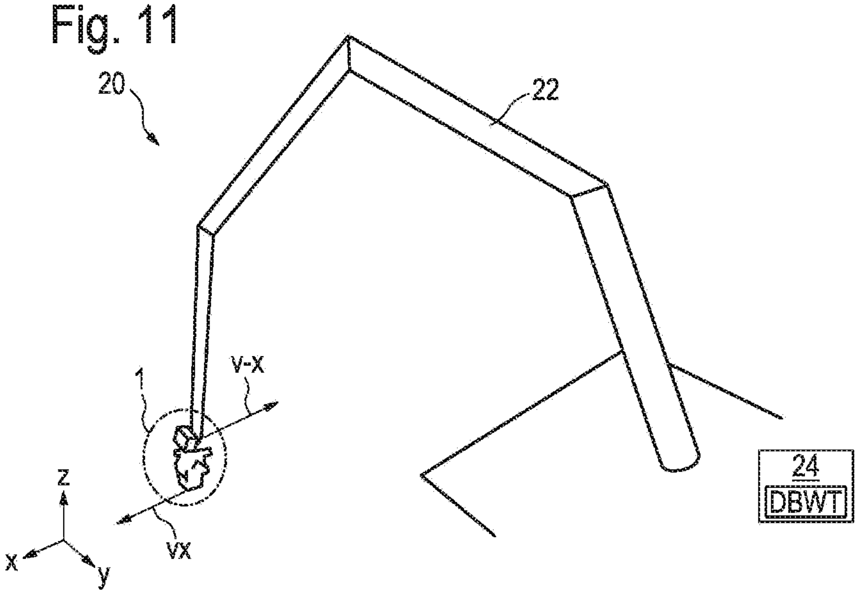
FIG. 11 shows a perspective view of the extruder system with the extruder apparatus of FIG. 1 and a movement apparatus.

Moreover, the extruder system 20 has an in particular controllable movement apparatus 22, as shown in FIG. 11. The movement apparatus 22 is designed to at least translationally move the extruder apparatus 1, in particular during the discharge of the strand ST of building material BS.

In the exemplary embodiment shown, the movement apparatus 22 has a movement arm. Additionally or alternatively, the movement apparatus 22 and/or the extruder apparatus 1 are/is designed to move the extruder apparatus 1 in rotation, in particular during the discharge of the strand ST of building material BS. In detail, the extruder apparatus 1 is rotatable about a longitudinal axis of the pipe flange by means of an in particular electric motor and in particular a screw drive.

In detail, the movement device 22 is designed to move the extruder apparatus 1 in an particular horizontal movement direction −x. The extruder apparatus 1 is designed for the discharge of the strand ST of building material BS out of the extruder apparatus 1 in the discharge direction x which is non-orthogonal, in particular opposite, to the movement direction −x, in particular during the movement.

Additionally or alternatively, the extruder system 20, in particular the extruder apparatus 1, is designed for the discharge of the strand ST of building material BS out of the extruder apparatus 1 with an in particular variably settable discharge speed vx. The movement apparatus 22 is designed to move the extruder apparatus 1 at a movement speed v-x approximately equal to the discharge speed vx, in particular during the discharge.

Figure 12:
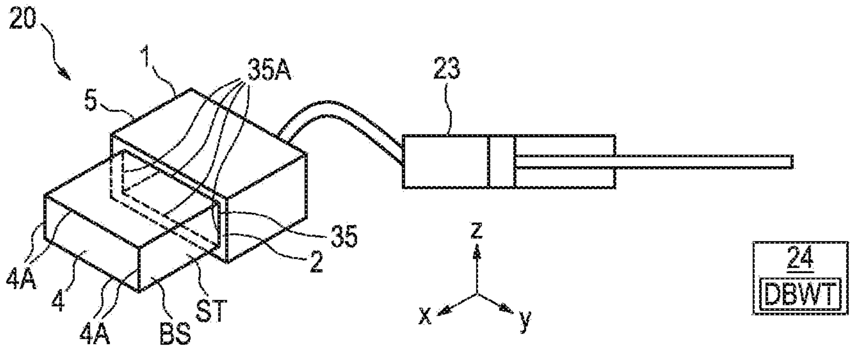
FIG. 12 shows a perspective view of the extruder system with the extruder apparatus of FIG. 1 and a building material pump, in particular during use according to the invention.

Furthermore, the extruder system 20 has an in particular controllable building material pump 23, as shown in FIG. 12. The building-material pump 23 is designed to convey building material BS out of the extruder apparatus 1.

In the exemplary embodiment shown, the building material pump is discontinuous, in particular a piston pump. Additionally or alternatively, the extruder system 20 has a building material conveying line, wherein the building material conveying line connects the building material pump 23 to the extruder apparatus 1 for a stream of building material BS from the building material pump 23 through the building material conveying line to the extruder apparatus 1.

Furthermore, the extruder system 20 has at least one in particular controllable setting apparatus 213, 217*a*, 217*b*, 218*a*, 218*b*. The at least one setting device 213, 217*a*, 217*b*, 218*a*, 218*b* is designed for the variable setting of the at least one in particular variably settable inner element 30*a*, 30*b* and/or of the at least one in particular variably settable peripheral wall 7*a*, 7*b* and in particular of the at least one in particular variably settable cover element 8*a*, 8*b*.

In the exemplary embodiments shown, the extruder apparatus 1 has the at least one setting apparatus 213, 217*a*, 217*b*, 218*a*, 218*b*.

In detail, the setting apparatus 213 for moving the at least one inner element 30*a*, 30*b* in/counter to the first peripheral direction y has an in particular electrical setting motor 213E and/or at least one movement deflecting mechanism 213U, in particular at least one lever mechanism, and/or an in particular mechanical linear drive 213L, in particular a threaded spindle drive. The setting motor 213E is arranged, counter to the discharge direction −x, behind the extruder nozzle 5 and in particular the deflecting device 9 and/or is connected in terms of movement to the at least one inner element 30*a*, 30*b* by means of the at least one movement deflecting mechanism 213U and/or the linear drive 213L.

In particular, the spindle, in particular in the deflecting device 9, is protected from the surrounding building material flow by means of a pipe.

In the exemplary embodiments shown, the two inner elements 30*a*, 30*b* are not designed to be mutually distinctly or individually or separately variably settable. In alternative exemplary embodiments, the two inner elements may in particular in each case be designed to be individually variably settable.

Furthermore, in FIGS. 1 to 9, the at least one setting apparatus 217*a*, 217*b* for moving the at least one peripheral wall 7*a*, 7*b* in/counter to the first peripheral direction y has an in particular electrical setting motor 217*a*E, 217*b*E and/or at least one movement deflecting mechanism 217*a*U, 217*b*U, in particular a lever mechanism, and/or at least one in particular mechanical linear drive 217*a*L, 217*b*L, in particular at least one threaded spindle drive. The at least one setting motor 217*a*E, 217*b*E is arranged, in particular transversely, in the second peripheral direction z above the extruder nozzle 5 or the peripheral wall 7*d* and/or is connected in terms of movement to the at least one peripheral wall 7*a*, 7*b* by means of the at least one movement deflecting mechanism 217*a*U, 217*b*U and/or the at least one linear drive 217*a*L, 217*b*L.

Figure 14:
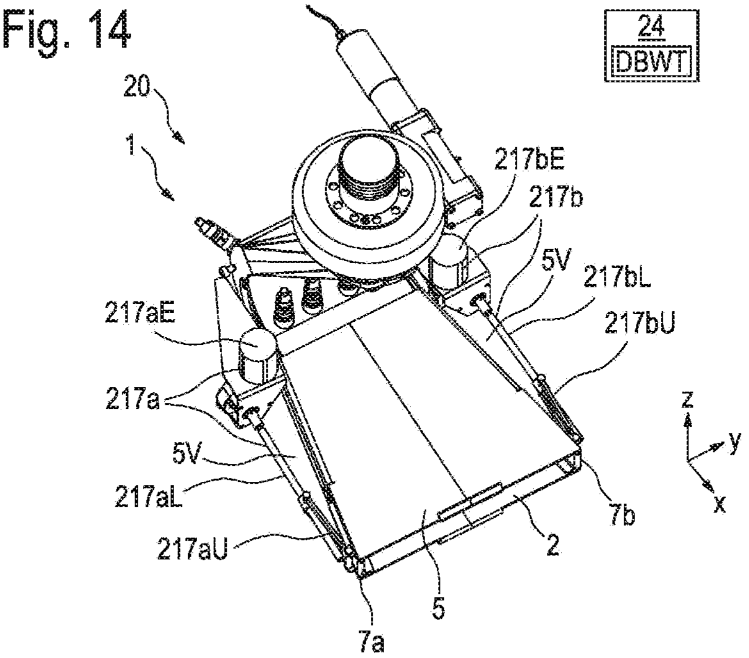
FIG. 14 shows a perspective view of a further extruder system according to the invention with a further extruder apparatus according to the invention.

In addition, in FIG. 14, the at least one setting apparatus 217*a*, 217*b* for moving the at least one peripheral wall 7*a*, 7*b* in/counter to the first peripheral direction y has an in particular electrical setting motor 217*a*E, 217*b*E and/or at least one movement deflecting mechanism 217*a*U, 217*b*U, in particular a lever mechanism, and/or at least one in particular mechanical linear drive 217*a*L, 217*b*L, in particular at least one threaded spindle drive. The at least one setting motor 217*a*E, 217*b*E is arranged, in particular longitudinally, in/counter to the first peripheral direction y to the side of the extruder nozzle 5 or the at least one peripheral wall 7*a*, 7*b* and/or is connected in terms of movement to the at least one peripheral wall 7*a*, 7*b* by means of the at least one movement deflecting mechanism 217*a*U, 217*b*U and/or the at least one linear drive 217*a*L, 217*b*L. In particular, the extruder nozzle 5 has, proceeding from the discharge opening 2, in particular in the case of maximum opening height HO, counter to the discharge direction −x, a taper 5V in/counter to the first peripheral direction y, wherein the at least one setting motor 217*a*E, 217*b*E is arranged to the side of the extruder nozzle 5 at the taper 5V.

In the exemplary embodiment shown in particular in each case in FIGS. 1 to 9 and 14, the two peripheral walls 7*a*, 7*b* are in particular in each case designed to be mutually distinctly or individually or separately variably settable. In alternative exemplary embodiments, the two peripheral walls may be designed not to be mutually distinctly variably settable.

Furthermore, the setting apparatus 218*a* for moving the at least one cover element 8*a*, 8*b* in/counter to the second peripheral direction z has an in particular electrical setting motor 218*a*E and/or an in particular mechanical rotary drive 218*a*D. The setting motor 218*a*E is arranged in the second peripheral direction z above the extruder nozzle 5 or the peripheral wall 7*d* and/or is connected in terms of movement to the at least one cover element 8*a*, 8*b* by means of the rotary drive 218*a*D.

In addition, the setting apparatus 218*b* for moving the at least one cover element 8*a*, 8*b* in/counter to the first peripheral direction y has an in particular electrical setting motor 218*b*E and/or a movement deflecting mechanism 218*b*U, in particular a belt mechanism, and/or an in particular mechanical linear drive 218*b*L, in particular a threaded spindle drive. The setting motor 218*b*E is arranged in the second peripheral direction z above the extruder nozzle 5 or the peripheral wall 7*d* and/or is connected in terms of movement to the at least one cover element 8*a*, 8*b* by means of the movement deflecting mechanism 218*b*U and/or the linear drive 218*b*L.

Furthermore, the extruder system 20, in particular the extruder apparatus 1, has a number of in particular controllable injection nozzles, in particular cyclically operated high-pressure nozzles with a pressure greater than 10 bar, in particular greater than 100 bar. The injection nozzles are designed for injecting, in particular for admixing or introducing, an additive, in particular concrete accelerator, in particular directly into the building material BS before it is discharged. This, in particular the high pressure, allows the additive to be widely distributed such that no further mixing element is required. In detail, the number of injection nozzles is arranged above the extruder nozzle 5 or the peripheral wall 7*d* in the second peripheral direction z and/or behind the extruder nozzle 5, and in particular the deflecting device 9, counter to the discharge direction −x. This, in particular the arrangement, makes it possible that, in pumping intervals or interruptions in the printing process, the smallest possible amount of activated building material, in particular concrete, is present in the extruder system 20, in particular the extruder apparatus 1, and/or has to be disposed of.

The extruder system 20 furthermore has a control device 24. The control device 24 is designed to in particular automatically control the at least one in particular controllable setting apparatus 213, 217*a*, 217*b*, 218*a*, 218*b* and/or the in particular controllable movement apparatus 22 and/or the in particular controllable building material pump 23, and in particular the number of in particular controllable injection nozzles, in a manner dependent on data DBWT of the structural part BWT to be printed.

Furthermore, the extruder system 20, in particular the extruder apparatus 1, is designed to deposit the discharged strand ST such that the in particular deposited strand ST maintains its strand cross section 4, in particular of the discharged strand ST.

Furthermore, the strand ST may be deposited, in particular in layers, on an already extruded strand ST and/or a further strand ST may be deposited, in particular in layers, on the strand ST, as shown in FIG. 13.

In particular, FIGS. 12 and 13 show the use according to the invention of the extruder apparatus 1 and/or of the extruder system 20 for the extrusion of the strand ST of building material BS for 3D printing of the structural part BWT, and structural parts BWT 3D-printed by means of the extruder apparatus 1 and/or the extruder system 20 and composed of extruded strands ST of building material BS.

In detail, the rectangular strand cross section 4 shown in particular in each case in FIG. 13 a), b) at the bottom and top, c) at the bottom and top, d) at the bottom and e) at the bottom may be specified or is specified by the at least one inner element 30*a*, 30*b* in the first setting and by the peripheral walls 7*a*, 7*b*, in particular in each case in the first setting or situated as far to the outside as possible, in particular without a cover element.

The rectangular strand cross section 4 shown in particular in each case in FIG. 13 c) in the middle, d) in the middle and at the top and e) at the top may be specified or is specified by the at least one inner element 30*a*, 30*b* in the second setting and by the peripheral walls 7*a*, 7*b*, in particular in each case in the first setting or situated as far to the outside as possible, in particular without a cover element.

The rectangular strand cross in the middle section 4 shown in FIG. 13 b) may be specified or is specified by the at least one inner element 30*a*, 30*b* in the second setting, by the peripheral wall 7*a* in the first setting or situated as far to the outside as possible and by the peripheral wall 7*b* in the second setting or situated as far to the inside as possible, in particular without a cover element. In particular, the inner element 30*b*, in particular by way of the end at the side of the discharge opening, and the peripheral wall 7*b* may lie against one another, or said element and peripheral wall lie against one another.

It is thus possible for slots be produced vertically in a strand or a layer or a ply ST and horizontally on an outer side of the strand ST, as shown in FIG. 13, in particular b) to e). In particular, it is thus possible to generate two narrow or thin structural parts or walls BWT which are connected by means of webs and which have a passage, in order for the intermediate space to later be filled with insulation material or to accommodate installation lines. In particular, the strand cross sections 4 of FIGS. 13 c), d) and e) may be arranged in particular in this sequence in and/or counter to the discharge direction x. In addition or alternatively, it is thus possible to produce open strand cross sections 4 in order to generate a media channel. In particular, the strand cross sections 4 of FIGS. 13 a), b), c) and d) may be arranged in particular in this sequence in and/or counter to the discharge direction x. Further additionally or alternatively, a support structure such as a lattice may be arranged and/or is arranged on those strands ST which do not extend over the entire maximum opening width BO, in order to allow at least one further strand ST to be deposited. This can make it possible to prevent soft building material from sagging downward into the space, in particular hollow space.

As the exemplary embodiments shown and discussed above make clear, the invention provides an advantageous extruder apparatus for the extrusion of a strand of building material for 3D printing of a structural part, which extruder apparatus has improved characteristics, in particular allows more degrees of freedom. The invention furthermore provides an extruder system having such an extruder apparatus, and the use of such an extruder apparatus and/or of such an extruder system.

The invention claimed is:

1. An extruder apparatus configured to extrude a strand of building material for 3D printing of a structural part, comprising:

a translationally movable extruder nozzle, wherein the translationally movable extruder nozzle has a discharge opening configured to discharge the strand of building material out of the extruder apparatus; and at least two inner elements, the translationally movable extruder nozzle specifies a discharge direction of the strand of building material out of the extruder apparatus, the at least two inner elements each have a flow-directing surface directing the flow of building material within the translationally movable extruder nozzle to define the inner edge of the flow cross section, wherein at least one of the at least two inner elements is arranged within the translationally movable extruder nozzle and is designed to be variably settable to variably set within the translationally movable extruder nozzle to variably set the inner edge of the flow cross section and to variably set the inner edge of the strand cross section, wherein the at least one inner element, in a second setting, specifies a division into two by way of an interruption in a horizontal direction of the strand cross section, translational motion of the at least two inner elements defines changes in shape and/or diameter of the building material, the translationally movable extruder nozzle has at least three peripheral walls, one of the peripheral walls being perpendicular to the other peripheral walls, peripheral walls define an outer edge of the flow cross section of building material to specify an outer edge of the strand cross section of the discharged strand of building material, and the peripheral walls are designed to be variably settable for variable arrangement with respect to one another to variably set the outer edge of the flow cross section and thereby variably set the outer edge of the strand cross section during the discharge of the strand of building material.

2. The extruder apparatus as claimed in claim 1, wherein the translationally movable extruder nozzle specifies a discharge direction of the strand of building material out of the extruder apparatus, wherein the at least two inner elements have a flow-directing surface directing the flow of building material within the translationally movable extruder nozzle to define the inner edge of the flow cross section, and the flow-directing surface is designed for non-orthogonal orientation with respect to the discharge direction.

3. The extruder apparatus as claimed in claim 1, wherein an extent of the extruder apparatus in a vertical direction is defined by the peripheral walls and wherein the discharge opening is peripherally partially defined by the peripheral walls, and/or the extruder apparatus has a deflecting device, wherein the deflecting device is arranged upstream of the discharge opening and is designed to deflect a flow of building material in the direction of the discharge opening.

4. An extruder system for extrusion of a strand of building material for 3D printing of a structural part, comprising:

an extruder apparatus as claimed in claim 1, and at least one controllable setting apparatus, wherein the at least one controllable setting apparatus is designed for variably setting the at least two inner elements and/or the at least three peripheral walls of the translationally movable extruder nozzle.

5. The extruder system as claimed in claim 4, further comprising:

a controllable movement apparatus, wherein the controllable movement apparatus is designed to at least translationally move the extruder apparatus during the discharge of the strand of building material.

6. The extruder system as claimed in claim 5, wherein the movement apparatus is designed to move the extruder apparatus in a horizontal movement direction, and wherein the extruder apparatus is designed to discharge the strand of building material out of the extruder apparatus in a discharge direction, which is non-orthogonal with respect to the movement direction during the movement, and/or the extruder system is designed for the discharge of the strand of building material out of the extruder apparatus with a variably settable discharge speed, and wherein the movement apparatus is designed to move the extruder apparatus with a movement speed which is approximately equal to the discharge speed during the discharge.

7. The extruder system as claimed in claim 5, further comprising:

a controllable building material pump, wherein the building material pump is designed to convey building material out of the extruder apparatus.

8. The extruder system as claimed in claim 7, further comprising:

a control device, wherein the control device is designed to automatically control the at least one setting apparatus, the movement apparatus, and/or the building material pump in a manner dependent on data of the structural part that is to be printed.

9. The extruder apparatus as claimed in claim 1, wherein the inner edge of the flow cross section is an area of the flow cross section and the inner edge of the strand cross section is an area of the strand cross section.

10. The extruder apparatus as claimed in claim 1, wherein the translationally movable extruder nozzle is cyclically operable with a pressure greater than 100 bar.

11. The extruder apparatus as claimed in claim 1, wherein the discharge opening of the translationally movable extruder nozzle is between 100 mm and 800 mm.

12. The extruder apparatus as claimed in claim 1, wherein the translationally movable extruder nozzle has a variable cross-sectional shape that can be modified in accordance with control parameters of the 3D printing process.

* * * * *